United States Patent Office 3,702,744
Patented Nov. 14, 1972

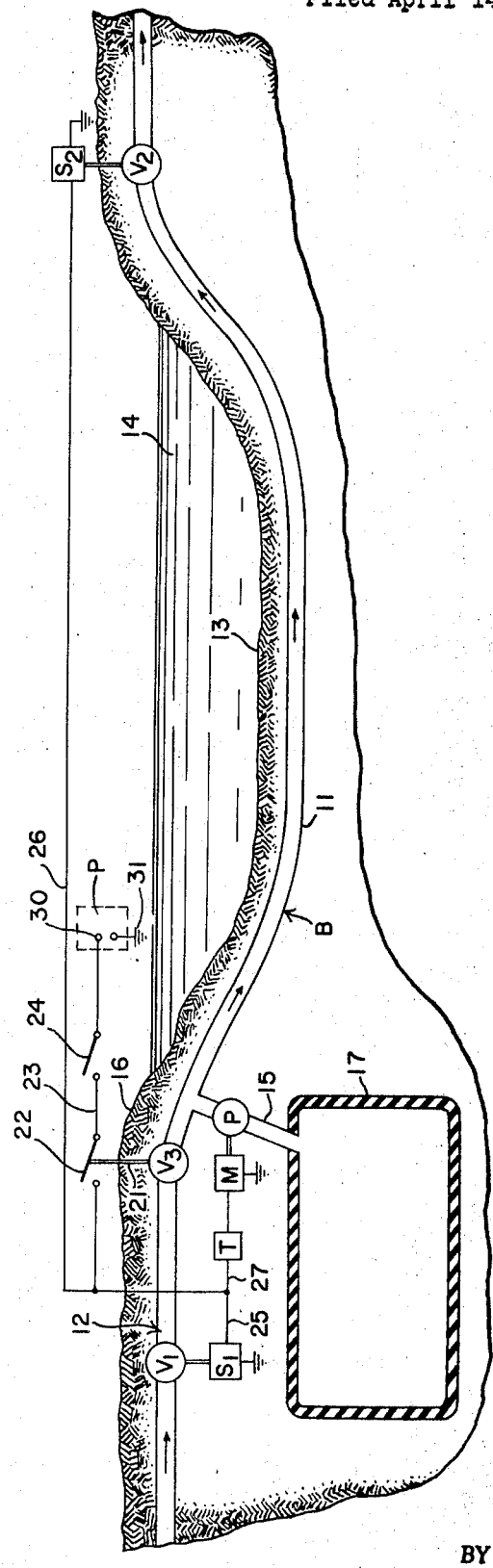

3,702,744
OIL TRANSPORTATION SYSTEM
Byron T. Brown, 1818 S. 16th St., Phoenix, Ariz. 85034,
and B. Stahmer, % Industrial Electrical Works Inc.,
1509 Chicago St., Omaha, Nebr. 68102
Filed Apr. 14, 1971, Ser. No. 133,900
Int. Cl. F04b 49/00
U.S. Cl. 417—12          8 Claims

ABSTRACT OF THE DISCLOSURE

An oil transportation pipeline system includes a shut-off valve arrangement for automatically isolating a leaking inaccessible line section such as a section buried in a river crossing and rapidly withdrawing oil from the isolated section into a container to protect the environment.

This invention relates to the transport of oil by pipeline and is particularly concerned with a system wherein, following a break in the line, a section of the line is isolated and the oil therein pumped out into a storage facility to minimize pollution to the environment.

The invention has particular application to oil pipeline systems traversing relatively isolated or inaccessible regions, where detection and repair of a broken line may be delayed for a considerable time during which oil may escape to pollute adjacent waterways and other areas. For example a break in a pipeline section buried beneath a river bed at a crossing may leak oil for days before being discovered and repaired. During this time the river may become polluted for miles.

It is the major object of the invention to provide at opposite ends of selected pipeline sections automatic valve arrangements operable to shut off flow to and isolate the section in which a leak occurs and an accompanying arrangement for emptying that section of oil as fast as possible to minimize uncontrolled leakage into the environment and to store the removed oil in a suitable retaining facility.

Further objects of the invention relates to details of automatic isolating valve operation and controls therefor sensitive to line pressure changes and associated pumping arrangements for rapidly emptying an isolated line section.

The drawing shows diagrammatically and partly in section a preferred embodiment wherein the pipeline section to be isolated is buried in a river or like bed.

As shown in the drawing a section 11 of an oil transportation pipeline 12, which may be up to forty-eight inches in diameter, is buried in a crossing beneath the bed 13 of a stream 14. Assuming that oil is being pumped under pressure in the direction of the arrows in the pipeline in the drawing, a normally closed branch conduit 15 at shore 16 is provided leading to a buried rubber or like container 17. Alternatively the container may be a concrete cell, a cavity or even a suitable locally porous lined wall region in the earth, and in any even the term container as used herein includes any oil receptive and retaining space defining arrangement as at 17. A pump assembly P preferably above the level of stream 14 is mounted in conduit 15 to normally block line 15, and it is activated to pump oil into container 17 under emergency conditions as will appear.

The pipeline contains normally open shut-off valves $V_1$ and $V_2$ at the opposite shores of the stream preferably well above the maximum water level of the stream, and these valves are connected to solenoid actuators $S_1$ and $S_2$ respectively. A pressure responsive valve $V_3$ or other pressure sensitive device is provided in the pipeline between valve $V_1$ and the juncture with branch conduit 15, and this device contains an operating arm 21 connected to a normally open switch 22 connected through an electrical conductor 23 and a manual switch 24 to one side 30 of an electrical power source P.

Conductor 23 is connected by conductor 25 to actuator $S_1$, by conductor 26 to actuator $S_2$, and by conductor 27 to a motor M for driving pump P. A normally closed relay T is provided in conductor 27 for a purpose to appear. The other side of the power source is shown as grounded at 31 for purposes of illustrative simplicity. When switch 24 is closed the system is adapted for automatic operation.

Should the pipeline break below the stream bed, as at point B, leakage will start and there will be a resulting reduction in oil pressure within the pipeline. Valve $V_3$ is of such characteristics that in response to a predetermined drop in oil pressure in the pipeline a pressure sensitive diaphragm, piston or the like therein (not shown) will move arm 21 to close switch 22. Valve $V_3$ is so constructed and calibrated that it will not close switch 22 during normal fluctuations in pipeline pressure, but will detect loss of pressure due to steady leakage at B.

When switch 22 closes it operates both actuators $S_1$ and $S_2$ to close valves $V_1$ and $V_2$ thereby shutting off oil flow in the pipeline between them and isolating the section 11 containing the break. At the same time, motor M is actuated to start pumping oil out of the isolated pipeline section. Pump P is usually provided of good capacity so that it will exert sufficiently high suction to rapidly empty pipe section 11 thereby rapidly limiting the leakage and ending it as soon as possible. A switchable air vent (not shown) may be provided at valve $V_2$, opened when the valve shuts.

Relay T is of such nature that it acts to open the circuit to pump motor M a predetermined time after that motor is energized, this time being that calculated to permit pump P to empty pipeline section 11.

Container 17 is preferably of at least such capacity as to hold all oil pumped out of pipeline section 11 in one operation of the control system.

It will be appreciated that the invention is not limited to pumping oil out of pipeline sections at stream crossings, but may be applied between any two spaced stations along the pipeline. For example shut off valves may be arranged at stations up to as much as twenty-five miles apart with suitable controls as above disclosed.

The embodiments of the invention in which an exclusive property or privilege is claimed are defined as follows:

1. An oil transportation pipeline system comprising a section thereof having normally open shut off valve means at opposite ends, normally closed conduit means connected to said pipeline section, means at said section responsive to a predetermined loss in oil pressure for closing said valve means to isolate said section and for withdrawing oil from the isolated section through said conduit means, and a container connected to said conduit means for receiving said withdrawn oil.

2. In the system defined in claim 1, said pressure responsive means comprising a pressure sensitive device disposed in said section.

3. In the system defined in claim 2, said means for withdrawing oil from said section being a motor driven pump assembly normally closing said conduit means.

4. In the system defined in claim 3, electrical operating means for said shutoff valve means and said pump motor connected in a common circuit, and a switch in said circuit operably connected to said pressure sensitive device.

5. In the system defined in claim 1, said container comprising a envelope of oil impervious material connected to said conduit means.

6. In the system defined in claim 5, said container being a bag of elastomeric material such as synthetic rubber having an inlet connected to said conduit means.

7. In the system defined in claim 1, time controlled means for disabling said withdrawal means a predetermined time after it is energized while maintaining said section isolated.

8. In the system defined in claim 7, said withdrawal means comprising a pump driven by an electric motor in an electrical circuit controlled by said pressure responsive means, and said time controlled means being a relay in said circuit for stopping the pump after said predetermined time.

References Cited

UNITED STATES PATENTS

| 2,895,328 | 7/1959 | Payne et al. | 73—49.1 |
| 2,936,611 | 5/1960 | Le Mat et al. | 73—40 X |
| 3,031,884 | 5/1962 | Martin | 73—40 |
| 3,500,841 | 3/1970 | Logan | 137—312 |
| 3,537,267 | 11/1970 | Webb | 137—236 X |

M. CARY NELSON, Primary Examiner

D. J. ZOBKIW, Assistant Examiner

U.S. Cl. X.R.

73—40.5 R, 49.1; 137—115, 236; 417—28